UNITED STATES PATENT OFFICE.

JOHN L. KELLOGG, OF BATTLE CREEK, MICHIGAN, ASSIGNOR TO KELLOGG TOASTED CORN FLAKE CO., OF BATTLE CREEK, MICHIGAN, A CORPORATION OF MICHIGAN.

MANUFACTURE OF BEVERAGE EXTRACTS.

1,204,358.          Specification of Letters Patent.      Patented Nov. 7, 1916.

No Drawing.     Application filed August 17, 1916.   Serial No. 115,505.

*To all whom it may concern:*

Be it known that I, JOHN L. KELLOGG, a citizen of the United States, residing in Battle Creek, in the county of Calhoun and State of Michigan, have invented a new and useful Improvement in the Manufacture of Beverage Extracts, (Case S,) of which the following is a specification.

My invention relates particularly to the manufacture of soluble beverage extracts used as substitutes for coffee, by percolating mixtures of roasted starch-bearing materials, such as wheat, corn, rye, barley, beans, peas, nuts, taro, arrow root and the like, and caramelized saccharine material, such as cane sugar, malt sugar, molasses, figs and the like. The liquid extract obtained from these mixtures is, by preference, concentrated by evaporation *in vacuo* to a dry quickly soluble powder, which is simply dissolved in hot water to make the beverage desired.

My invention consists of an improved product made by my improved process for which my application for patent filed April 24, 1916, Serial No. 93,266, was allowed May 18, 1916. The said process consists mainly in first cooking the starch-bearing material before roasting, in the manner substantially as hereinafter described and claimed, so that a much larger yield and better flavor are obtained than by the process heretofore generally employed.

In the present performance of my improved process, I use, by preference, grain, such as wheat and rye, bran and cane sugar.

The wheat and rye are first thoroughly cooked for about forty (40) minutes until the starches have been well dextrinized. The grains are then thoroughly dried by hot air, until the grain berries are above normal size but somewhat shriveled. The grains are then roasted, at the usual temperatures, and then ground ready for blending.

The sugar is cooked for about five (5) hours until it is thoroughly candied and caramelized. The caramelized sugar is mixed with about an equal quantity by weight of bran, preferably wheat bran, and the mixture dried and roasted in the usual way. A blended mixture is then made of about one-third cooked and roasted wheat, one-third cooked and roasted rye, and one-third bran and caramelized sugar. The mixture is then preferably percolated, and the liquid extract evaporated *in vacuo* to a quickly soluble powder for use in the usual way.

The above described special cooking preparatory to the roasting, facilitates the roasting process, gives a much larger yield of liquid extract and greatly improves the flavor of the same, and hence the final soluble powder evaporated therefrom.

I claim as my invention:

A beverage extract, consisting of the extract of a mixture of a starch-bearing material, which has been first cooked until the starches are well dextrinized and then roasted, and caramelized saccharine material.

JOHN L. KELLOGG.

Copies of this patent may be obtained for five cents each, by addressing the "Commissioner of Patents, Washington, D. C."